Patented Apr. 13, 1943

2,316,311

UNITED STATES PATENT OFFICE 2,316,311

PRODUCTION OF ALLERGIC EXTRACTS

Charlotte H. Boatner, New Orleans, La., assignor to B. D. E. Corporation, New Orleans, La., a corporation of Louisiana No Drawing. Application March 11, 1939,
Serial No. 261,367

15 Claims. (Cl. 167—78)

This invention relates to improvements in the production of allergic extracts and concentrates, and includes improvements in processes of purification and concentration of allergic factors and the production of improved extracts or concentrates.

Various materials, such as house dust, pollens, various foods, animal hairs and danders, feathers, cotton, wool, orris root, orange juice, apple juice, pyrethrum, silk, etc., contain certain factors or principles to which some people are hypersensitive. Contact with, or consumption of, or inhalation of such materials by a person sensitive to them may cause ailments such as hay fever, asthma, skin eruptions, etc.

So-called allergic extracts have heretofore been produced from such materials and used in the so-called skin and mucous membrane tests to determine sensitivity thereto; and extracts of certain materials have been used for immunizing or curative purposes.

In methods previously used for producing allergic extracts, the extraction of the material is carried out in aqueous extracting fluids, after fatty substances have been removed from the material with fat solvents. In some cases the aqueous extracts so produced have been used directly as allergic extracts, or used after concentration of the aqueous solution; while in other cases the aqueous extract has been precipitated, e. g. by adding acetone to produce a precipitate which is desiccated and then ground to a powder. Such processes make little or no separation of the allergic factor or factors from the other substances extracted from the original material by the aqueous extracting fluids.

The present invention provides an improved method for the production of allergic extracts and concentrates of increased allergic activity and with greatly reduced content of inert or objectionable constituents heretofore commonly present in allergic extracts.

The present invention provides an improved method for the purification and concentration of the allergic factor or factors present in extracts made in aqueous extracting fluids.

I have discovered that the allergic factor or factors present in extracts made in aqueous extracting fluids can be purified and concentrated by subjecting the aqueous extract to fractional precipitation by the addition of a suitable ether, ketone or mono-hydroxy alcohol having at least three carbon atoms and miscible with water, e. g., acetone, dioxane, isopropyl alcohol, tertiary butyl alcohol, allyl alcohol or ethylene glycol mono methyl ether.

I have also found that improved allergic extracts and concentrates can be produced by combining such fractional precipitation with a separate treatment such as subsequent fractional precipitation with a salt, e. g., ammonium sulfate, sodium sulfate or zinc sulfate.

I have found that certain of the constituents commonly contained in allergic extracts or concentrates as heretofore produced are inert or objectionable, and that by the removal, to a greater or less extent, of such inert or objectionable constituents, highly active allergic extracts and concentrates can be produced.

The improved processes of the present invention include novel steps and combinations of steps in the treatment of the aqueous extracts and products produced therefrom. The nature of the invention will be further understood from the following more detailed description.

The production of the aqueous extract is in general carried out in accordance with processes such as have heretofore been used in producing aqueous extracts, fats being first removed by extraction with a suitable fat solvent, and an aqueous extract being then made with water or normal saline solution, or isotonic salt solutions, etc. More elaborate procedures have often been used with such substances as milk, etc. Aqueous extracts so obtained are then subjected to one or more of the fractional precipitation treatments of the present invention.

The fractional precipitation treatment with the use of a water-miscible organic solvent or liquid is carried out by adding successive amounts of the organic liquid to the aqueous extract to give solutions containing progressively increased amounts of the organic liquid, and with successive separation of insoluble substances. In the case of aqueous extracts of house dust, for example, the addition of acetone in amount equal to the aqueous extract, to give an acetone-water solution containing about equal proportions of acetone and water, will result in the separation of a precipitate which is for the most part inactive or inert or even objectionable in character and with relatively little allergic activity; while by removing the precipitate and then adding a further amount of acetone to the filtrate to give an acetone-water solution containing around 75 or 80% of acetone, a precipitate is obtained which is of high allergic activity.

Acetone is well adapted for use in such fractional precipitation treatments; but I have found that other ketones, or ethers or mono-hydroxy alcohols having at least three carbon atoms which are miscible with water such as dioxane, ethylene glycol mono-methyl ether, allyl alcohol, tertiary butyl alcohol and isopropanol can also be used to advantage. These liquids do not materially denature proteins and are readily miscible with water. Methyl alcohol and ethyl alcohol seem to denature the proteins and to be objectionable for that reason.

The concentrated product so produced can be further improved by dissolving it in water and treating the solution with ammonium sulfate or other salts to bring about precipitation of constituents, insoluble in solutions of such salts. The precipitate so obtained is of increased activity and value. Instead of using ammonium sulfate, certain other salts, such as sodium sulfate or zinc sulfate can be used, although ammonium sulfate is particularly advantageous. Following the use of the sulfate salts, such salts as remain in the precipitated product are dialyzed out of a solution of such product through a semipermeable membrane. Further concentration of the resulting purified allergic factor or factors can be accomplished by partial evaporation of the solvent; while by complete evaporation of the solvent the extract is obtained in the form of a solid or extremely viscous liquid containing the purified allergic factor or factors.

The invention will be further illustrated by the following specific examples, but it will be understood that the invention is not limited thereto.

House dust collected by means of a vacuum cleaner from mattresses and pillows and upholstered furniture is treated with ether, carbon tetrachloride or other fat solvents in order to remove fats. The fat-free house dust is then extracted with water or an aqueous fluid using for example, one liter of aqueous liquid per pound of dust. The extracting fluid known as Coca's extracting fluid is well adapted for use. Coca's extracting fluid contains 0.5% sodium chloride, 0.275% sodium bicarbonate, 0.40% phenol, and about 98.825% water. The extraction can be carried out by shaking the dust and water or aqueous fluid together and leaving them in contact with each other for, e. g., forty-eight hours. The aqueous liquid is then separated from the undissolved material, e. g., by squeezing in a filter cloth, and the liquid then passed through a suction filter and finally through a Seitz filter to remove all undissolved solids.

In one instance the solution thus obtained was found to contain around 4.4% of dissolved solids, that is, about 4.4 grams of dissolved solids per 100 cc. of solution. Approximately 700 cc. of extract was obtained per liter of solution initially used.

The house dust extract thus obtained was mixed with an equal volume of acetone to give a solution containing about 50% of acetone and 50% of water, and the mixture was allowed to stand, e. g., for two hours at icebox temperatures, i. e., a temperature of about 3° C. A practically colorless solid separated out of the solution. The supernatant liquid was drawn off and passed through a filter and the solids separated out by filtration. The solids so obtained were found to contain very little allergic activity and to be only slightly soluble in water.

The filtrate remaining after the separation of the solids was treated with sufficient additional ice-cold acetone to bring the content of acetone in the liquid up to around 80%. After standing at icebox temperature for about two hours, a syrupy solid had settled out of the solution. The supernatant liquid was drawn off and the syrupy solid dried. It was found to be readily and completely soluble in water and to possess a very high degree of allergic activity. It represented only about 25% of the original dissolved material contained in the initial extract.

On adding to the filtrate a further amount of acetone to bring the acetone content up to about 90% of the total acetone-water mixture and allowing to stand at icebox temperatures for about four hours, a further syrupy precipitate was obtained, which, although readily soluble in water was found to possess relatively slight allergic activity.

The initial precipitate produced from the 50% acetone solution was of such low allergic value as to be of little value, and its constituents seemed to be objectionable in character from an allergic extract standpoint. This initial solid precipitate can, however, with advantage be extracted with a limited amount of water to remove therefrom some of the allergic principles contained therein, which appear to be more readily soluble, while the solid precipitate is itself difficultly soluble or relatively insoluble in this limited amount of water. The extract so obtained can be added to other extracts to be subsequently treated in the process.

The intermediate liquid precipitate, obtained from the 80% acetone liquid, and freed from constituents precipitated from the 50% acetone solution, was highly active and apparently contained the greater part of the total allergic value of the initial aqueous extract, but in a highly concentrated and more advantageous form. This precipitate can be further freed from non-advantageous substances by subjecting it to dialysis through a semi-permeable membrane impermeable to the active allergenic factors. The syrupy solid obtained by removal of water, either with or without further purification by means of dialysis, is rendered less hygroscopic and therefore more stable (i. e., more easily stored in an anhydrous form) by successive treatments with diethyl ether which dissolves the impurities which are responsible for the hygroscopic properties but does not dissolve the substance containing the allergic activity.

In general, in the case of dust extracts, I have found that the constituents precipitated from a 50–50 acetone-water solution are relatively only slightly active and are only slightly soluble in water, while the precipitate separated from the resulting solution by increasing the acetone content to 60, 70, and 80%, are precipitates of high allergic value and of marked activity and readily soluble in water, while the constituents remaining in solution in the 80% acetone liquid, and precipitable, e. g., with 90% acetone, have relatively slight allergic activity.

Instead of using acetone as the organic liquid miscible with water, in the fractional precipitation process, other organic liquids, for example, dioxane, isopropanol, tertiary butyl alcohol, allyl alcohol or ethylene glycol mono-methyl ether, can be used; or such other liquids can be used in the subsequent purification steps.

For example, a house dust extract produced as above described can be treated with an equal volume of acetone and the solid precipitate thus formed separated out and removed from the solution by filtration and discarded; and the filtrate then treated with an equal volume of acetone to bring the acetone content up to around 75%, with precipitation and separation of a syrupy precipitate which can be separated from the supernatant liquid by decantation, and the solution discarded.

The insoluble precipitate separated from the 75% acetone mixture with water can then be dissolved in a limited amount of water to give, e. g., a solution containing around 15% of dissolved material and treated by adding dioxane to give about 40% dioxane with separation of a tan solid removable by filtration or centrifuging and which is very slightly soluble in water and contains very little allergic activity.

On treating the supernatant liquid with additional dioxane to give about 50% content in the liquid, a syrup was separated from the solution which was found to be completely soluble in water and to have good allergic activity. On separating this material and adding more dioxane to supernatant liquid to give about 75% content of dioxane in the liquid, a readily soluble syrup was separated of high allergic activity. The syrup subsequently separated from the liquid by increasing the dioxane content to 90% was readily soluble in water but possessed only slight allergic activity.

It will be evident that the product produced originally by the fractional precipitation from 75% acetone after previous removal of the 50% acetone insoluble product was subsequently further purified by fractional precipitation with dioxane, to remove further amounts of inert constituents of little or no value, and to give an increased concentration of allergically active principle or factor.

When dioxane is used for fractional precipitation of the water extract of house dust, a product obtained up to about 35% dioxane is insoluble and relatively inactive; while the products obtained with 50%, 75% and 90% after removal of the product insoluble in 35% dioxane were of syrupy consistency, and those obtained with 50% and 75% were of high allergic activity, while that obtained with 90% dioxane after removal of the 75% dioxane insoluble product was relatively inactive.

With isopropanol as the organic liquid miscible with water for effecting the fractional precipitation from the aqueous solution of house dust, the product obtained up to about 40% isopropanol is solid and relatively inactive, that obtained from 75% isopropanol after removal of the product insoluble in 40% isopropanol was an oil or syrup and highly active; while that obtained from 88% isopropanol after removal of the 75% isopropanol insoluble product was an oil or liquid and was only slightly active.

The product obtained in a similar manner with 50% ethylene glycol mono-methyl ether and water is relatively slightly active; while that obtained from 80% ethylene glycol mono-methyl ether, after removal of the 50% ethylene glycol mono-methyl ether insoluble product, is an oily solid of relatively great allergic activity.

In a similar manner active products can be obtained using allyl alcohol or tertiary butyl alcohol as the organic solvent with water.

The allergic extracts obtained as intermediate precipitates in the fractional precipitation process of the above examples can themselves be used directly as allergic extracts or concentrates or this can be further purified by subjecting it to dialysis through a suitable semi-permeable membrane to dialyze any dialyzable impurities. The oil obtained, either before or after dialysis, after removal of the water, can be rendered more serviceable by treating it with ether which removes the substances which tend to make it hygroscopic. After treatment with ether the syrup is more easily preserved in a dry condition and is therefore more stable. Such products can be prepared and preserved either in a dry state or in solution of regulated strength; and they provide valuable concentrated allergic extracts.

It is advantageous in many cases to effect further purification of the concentrated product, and this can advantageously be effected by dissolving the product in a limited amount of water and treating the solution with ammonium sulfate. For example, the concentrate obtained by precipitation with 75% acetone, and previously freed from the precipitate separated by 50% acetone, as above described, can be dissolved in water to form, e. g., a solution containing around 15 or 20% of the syrupy precipitate dissolved therein, and the solution then saturated with ammonium sulfate, with resulting separation of a solid from the solution. In this way the greater part of the allergically active content of the solution is precipitated, leaving relatively little allergically active product in the solution. The solid precipitated out of the saturated ammonium sulfate solution can be further dissolved in a similar amount of water and the solution again saturated with ammonium sulfate, the precipitate removed from the solution by filtration, then dissolved in water and subjected to dialysis with the use of a semipermeable membrane to dialyze out adhering ammonium sulfate and any dialyzable impurities. The solution thus obtained, free from ammonium sulfate, was a highly active allergic product, containing potent allergenic factor. A solution prepared in this manner which contained .026 g. of dissolved solids in 10 cc. of solution was more potent than an original dust extract containing 0.318 g. of dissolved solids in 10 cc. of solution.

In a similar manner the product above described, and which had been further purified by fractional precipitation with dioxane can be similarly further purified by treatment with ammonium sulfate in a similar manner. In this case there are three successive fractional precipitation steps or treatments, first with acetone, second with dioxane, and finally with ammonium sulfate, and with resulting production of a highly active allergic extract or concentrate.

Instead of using ammonium sulfate for the further fractional precipitation and purification treatments, other salts can be similarly used, for example, zinc sulfate and sodium sulfate.

In some cases the fractional precipitation treatment with ammonium sulfate or other salts can advantageously precede the fractional precipation treatment with water-miscible organic solvents.

For example, the aqueous extracts of house dust, previously referred to, can be first saturated with ammonium sulfate and the resulting solid precipitate filtered off or removed by centrifuging from the solution, and the solution discarded. The solid thus produced can be dissolved in water and subjected to dialysis to remove ammonium sulfate and other dialyzable impurities and then treated with the organic solvent, for example, acetone, to bring about a further fractional precipitation treatment and purification to remove the relatively inert materials insoluble, e. g., in 50% acetone, leaving in solution the valuable allergic factors, or the solution can be further subjected to treatment with acetone, e. g., sufficient to give a 75% acetone solution, and a highly active allergic concentrate obtained by precipitation.

These highly concentrated and purified products, as well as those which have been subjected to part but not all of the successive fractionation treatments, are valuable products for both therapeutic and diagnostic purposes.

While the above examples deal with the application of the invention to the treatment of house dust, and to the production of valuable allergic extracts or concentrates therefrom, the invention is applicable to the treatment of other substances and to the production of other allergic extracts and concentrates.

For example, timothy grass pollen after removal of oils by treatment with fat solvents can be subjected to extraction with water and an extract containing around 6½% dissolved constituents subjected to fractional precipitation by the addition of progressively increased amounts of acetone. Up to around 60% acetone, the solid precipitate had relatively little allergic activity; but the product subsequently produced on increasing the acetone content in the filtrate to around 80% gave an oily solid slightly orange in color and highly active. This product can be used directly or subjected to dialysis to remove dialyzable impurities or it can be further improved by dissolving it in water and adding ammonium sulfate to saturation, filtering off the flocculent precipitate obtained, treating the precipitate with water to dissolve the greater portion of it and filtering to remove the insoluble constituents, purifying the resulting solution by again saturating with ammonium sulfate, filtering off the precipitate, redissolving and dialyzing to remove ammonium sulfate and other dialyzable impurities. The resulting solution contains a highly active material with the allergic factor of grass pollen present in high concentration. For instance, in one of a series of experiments an extract so produced which contained only 1.2% dissolved solids was found to be more active than an original extract containing 6.8% dissolved solids.

In a similar way, valuable allergic extracts and concentrates can be obtained from orris root, pyrethrum, and other materials, by treating in a manner similar to that above described for house dust.

In the case of orris root, for example, the aqueous extract, treated with acetone up to about 60% of the total liquid, gave a solid of little allergic activity; while the product subsequently obtained, after filtering off the substance precipitated from 60% acetone, on increasing the acetone content of the filtrate up to around 75% was highly active. This oily concentrate can be further purified by redissolving it in water and treating with ammonium sulfate to saturation, etc. in a similar manner to that above described.

Similarly pyrethrum, on treatment of an aqueous extract, gave with up to about 50% acetone a solid precipitate of little value, and subsequently gave, on increasing the acetone content up to around 80%, an oily or syrupy liquid which is highly active and which can be further purified, for example, by the ammonium sulfate treatment above illustrated and described.

The invention is similarly applicable to various other products for the production of improved allergic extracts and concentrates therefrom, including food products of various kinds, both solid and liquid, e. g., fruit juices such as orange juice, apple juice, etc.

In the foregoing description and examples, the initial extract is made with water or an aqueous liquid, and the resulting extract is subjected to fractional precipitation to remove inert and objectionable constituents having little or no allergic value and to give a concentrated allergic product.

In some cases the fractional purification can be carried out initially by fractional extraction, using, instead of water or the usual aqueous liquids, a mixture of water and miscible organic solvents, e. g., 50-50 acetone-water, with resulting extraction of the valuable allergic factors or constituents, while leaving undissolved those constituents which are insoluble in the acetone-water mixture, but which would be soluble in the usual aqueous liquids commonly employed.

For example, instead of extracting house dust with water, using one hundred cc. of water per 50 g. of dust, the house dust can be extracted with a mixture of equal parts of acetone and water, using, for example, two hundred cc. of the mixture per 50 g. of house dust. By proceeding in this way, the initial step of adding to an aqueous extract sufficient acetone to form, e. g., a 50-50 acetone-water solution, and to precipitate the insoluble constituents insoluble in such solution, is eliminated, and an equivalent result is obtained by the fractional extraction which leaves these solid constituents undissolved, and gives directly a solution containing the valuable soluble allergic factors or constituents, containing little of the relatively insoluble and relatively inert or objectionable constituents.

The solution obtained by such fractional extraction can then be further treated by the addition of more acetone to increase the content from, e. g., 50% up to, e. g., 75% or 80%, and to give a precipitate in a liquid or oily or similar state which contains the valuable allergic factors or constituents, and which can be further purified in a manner similar to that described in the foregoing examples.

Products produced in accordance with the present invention are valuable allergic products useful for diagnostic and therapeutic purposes. In some cases the purification and concentration obtained by the fractional precipitation with a single organic solvent, e. g., acetone, may be sufficient to eliminate enough inert or objectionable solid constituents to render the subsequent fraction containing the valuable allergic factors or constituents useful for diagnostic and therapeutic purposes. The extract so prepared is free, not only from the previously precipitated solid constituents, but also from those constituents remaining in solution when the valuable allergic precipitate is obtained. Such a product, after this fractional precipitation process, may be characterized as a product which has been freed from insoluble constituents, insoluble in, e. g., 50% acetone-water, but containing constituents precipitable, e. g., with 75% or 80% acetone-water, and freed also from soluble constituents, soluble in, e. g., 75% or 80% acetone. Such an intermediate product, characterized by such solubilities, contains most of the valuable allergic factors of the initial extract, and is freed from much of the undesirable or objectionable constituents contained in the initial product.

When the product thus produced is subjected to further and subsequent fractional precipitation treatments, e. g., with other organic solvents, or with saturated ammonium sulfate solution treatment, products of improved allergic value, and increased purity, are obtained.

Thus the product produced by successive treatment, first with a suitable organic solvent miscible with water to accomplish the initial purification, and by subsequent treatment with ammonium sulfate, as above described, is characterized by high allergic value and by insolubility in a saturated ammonium sulfate solution, insolubility e. g. in 75% or 80% acetone-water solution, and freed from constituents insoluble in, e. g., 50% acetone-water solution. The products are generally characterized by being freely soluble or of infinite solubility in water such that they are valuable products for use for diagnostic and therapeutic purposes.

It will be understood that the fractional purification treatment with organic solvents miscible in water may be a single fractional treatment, or successive fractional treatments with the same or different organic solvents and with final treatment of a solution of the product by dialysis. It will also be understood that the ammonium sulfate treatment, whether it precedes or follows one or more of the fractional organic solvent treatments, can itself be carried out one or more times, depending upon the degree of purification desired, and with final treatment of a solution of the product by dialysis to remove adhering ammonium sulfate and other dialyzable constituents, and leaving highly active solutions containing the allergic factors in a highly concentrated state which can be further concentrated by partial removal of the solvent, or from which dry powders or dry syrups or oils or liquids can be produced by complete or substantially complete removal of the solvent.

I claim:

1. The process of producing extracts or concentrates of allergic factors from substances containing such factors which comprises treating said substances with a mixture of water and an organic solvent miscible with water of the class consisting of ethers, ketones and mono-hydroxy alcohols having at least three carbon atoms, to dissolve soluble constituents of the allergic-factor-containing-substances, the proportions of water and organic solvent being such that further increase in the proportion of organic solvent results in precipitation of an active precipitate, and adding more of the organic solvent to said solution to separate an active precipitate.

2. The process of producing extracts or concentrates of allergic factors from substances containing such factors which comprises forming an aqueous extract of such substance after removal of fat therefrom, adding an organic solvent miscible with water of the class consisting of ethers, ketones and mono-hydroxy alcohols having at least three carbon atoms in amount sufficient to precipitate a non-active precipitate, removing such precipitate and adding more of the organic solvent to the solution, to precipitate an allergically active fraction, and separating such fraction.

3. The process as in claim 1, in which the precipitate formed on the addition of the organic solvent is further purified by dissolving it in water and adding to the resulting solution a water soluble sulfate of the class consisting of ammonium, sodium and zinc sulfates to separate an active precipitate.

4. The process of preparing extracts or concentrates of allergic factors from substances containing such factors which comprises forming an aqueous extract of the fat-free substance, adding a water soluble sulfate of the class consisting of ammonium, sodium and zinc sulfates to the extract to precipitate active material, separating the precipitate and dissolving it in water, adding to the resulting aqueous solution an organic solvent miscible with water of the group consisting of ethers, ketones and mono-hydroxy alcohols having at least three carbon atoms in amount sufficient to precipitate non-active material, separating the resulting precipitate and adding more of the organic solvent to the separated solution to precipitate an allergically active fraction.

5. The process of producing extracts or concentrates of allergic factors of house dust, which comprises treating the house dust with a mixture of water and an organic solvent of the class consisting of ethers, ketones and mono-hydroxy alcohols having at least three carbon atoms miscible with water, to dissolve soluble constituents of the house dust, the proportions of water and organic solvent being such that further increase in the proportion of organic solvent results in precipitation of an active precipitate, and adding more of the organic solvent to said solution to precipitate an allergically active fraction.

6. The process of producing extracts or concentrates of allergic factors from house dust, which comprises freeing the house dust from fat, forming an aqueous extract of the fat-free house dust, adding sufficient of an organic solvent of the class consisting of ketones, ethers and mono-hydroxy alcohols having at least three carbon atoms miscible with water to the resulting extract to precipitate non-active materials, separating the precipitate, and adding more of the organic solvent to said solution to precipitate an allergically active fraction.

7. The process as in claim 1, in which the organic solvent is dioxane.

8. The process as in claim 1, in which the organic solvent is acetone.

9. The process as in claim 1, in which the organic solvent is isopropanol.

10. The process as in claim 2, in which the organic solvent is dioxane.

11. The process as in claim 4, in which the organic solvent is dioxane.

12. The process as in claim 6, in which the organic solvent is dioxane.

13. The process as in claim 5, in which the organic solvent is dioxane.

14. The process as in claim 5, in which the organic solvent is acetone.

15. The process as in claim 5, in which the organic solvent is isopropanol.

CHARLOTTE H. BOATNER.